(12) United States Patent
Martinez et al.

(10) Patent No.: US 8,640,523 B2
(45) Date of Patent: Feb. 4, 2014

(54) APPARATUS AND METHOD FOR TURBINE FLOW METER SENSOR ADJUSTMENT

(75) Inventors: Moises Martinez, Houston, TX (US);
Thomas H. Loga, Sugar Land, TX (US);
Sheldon Tullos, Houston, TX (US);
Anthony Jones, Houston, TX (US);
Raul Almazan, Chihuahua (MX)

(73) Assignee: Daniel Measurement and Control, Inc., Houston, TX (US)

( * ) Notice: Subject to any disclaimer, the term of this patent is extended or adjusted under 35 U.S.C. 154(b) by 535 days.

(21) Appl. No.: 12/911,899

(22) Filed: Oct. 26, 2010

(65) Prior Publication Data
US 2012/0096920 A1    Apr. 26, 2012

(51) Int. Cl.
*G01P 21/00*    (2006.01)
(52) U.S. Cl.
USPC .......................................................... 73/1.28
(58) Field of Classification Search
USPC .................... 73/1.28, 863.79, 861.74–861.79
See application file for complete search history.

(56) References Cited

U.S. PATENT DOCUMENTS

| 4,091,653 | A  | * | 5/1978 | Lee .................................. 73/1.28 |
| 5,018,384 | A  |   | 5/1991 | Hayashi et al. ............. 73/115.08 |
| 6,250,167 | B1 |   | 6/2001 | Peace et al. ................. 73/861.77 |
| 2004/0035220 | A1 |   | 2/2004 | Payne et al. ................ 73/861.79 |

FOREIGN PATENT DOCUMENTS

KR    10-2010-0022623 A    3/2010

OTHER PUBLICATIONS

International Application No. PCT/US2011/056515 Search Report and Written Opinion dated May 8, 2012.

* cited by examiner

*Primary Examiner* — Peter MacChiarolo
*Assistant Examiner* — Tamiko Bellamy
(74) *Attorney, Agent, or Firm* — Conley Rose, P.C.

(57) ABSTRACT

A method and apparatus for calibrating a turbine flow meter via adjustment of electromagnetic sensor position are disclosed herein. In one embodiment, a turbine flow meter includes a flow tube, a plurality of electromagnetic pickups, and a locator plate. The electromagnetic pickups are configured to detect rotation a flow indicator in the flow tube. The pickups are secured to the locator plate. The locator plate is configured to adjustably position the pickups relative to the flow tube.

23 Claims, 6 Drawing Sheets

APPARATUS AND METHOD FOR TURBINE FLOW METER SENSOR ADJUSTMENT

BACKGROUND

Fluids, hydrocarbons for example, are transported from place to place via pipelines. It is desirable to know with accuracy the amount of fluid flowing in a pipeline particularly when a fluid is bought or sold. That transaction, or "custody transfer," demands a flow meter of particular accuracy. Custody transfer can occur at a fluid measurement station. Measurement stations may include key components, such as the flow meter or measurement device, associated pipes and valves, and electrical controls. The custody transfer flow meter may be a turbine meter, a positive displacement meter, an ultrasonic meter, a coriolis meter, a vortex meter, or another measuring device.

Turbine flow meters measure fluid by measuring the rate of rotation of a turbine disposed in the fluid stream. The fluid stream flowing through the flow meter impinges upon the blades of the turbine causing the blades to rotate. The angular velocity of the turbine rotor is proportional to the velocity of the fluid stream.

The turbine flow meter can include an electromagnetic sensor comprising a permanent magnet and a coil. As each turbine blade, or other flow indicator feature (e.g., paramagnetic button mounted in a rim around the blades) of the turbine, moves into close proximity with the sensor, the magnetic field of the sensor is deflected, producing a voltage in the sensor's coil. Thus, the sensor generates a series of voltage pulses whose frequency corresponds to the rate of rotation of the turbine and the velocity of the fluid stream through the meter.

Some turbine flow meters include more than one electromagnetic sensor. In such meters the signals from the different electromagnetic sensors may be compared to one another to provide validation of proper meter operation. Various attributes of the sensor output signals, including for example frequency, phase, etc., may be compared in a validation process. The positions of the sensors relative to other meter components (e.g., the axis of the turbine rotor) may affect the sensor output signals, and consequently affect the operation of the meter.

SUMMARY

A method and apparatus for calibrating a turbine flow meter via adjustment of electromagnetic sensor position are disclosed herein. In one embodiment, a turbine flow meter includes a flow tube, a plurality of electromagnetic pickups, and a locator plate. The electromagnetic pickups are configured to detect rotation a flow indicator in the flow tube. The pickups are secured to the locator plate. The locator plate is configured to adjustably position the pickups relative to the flow tube.

In another embodiment, a method includes securing a plurality of electromagnetic pickups to a locator plate. A position of the locator plate is adjusted relative to a flow tube of a turbine flow meter until detection signals provided by two of the pickups exhibit a predetermined amount of phase difference.

In yet another embodiment, a flow meter pickup mounting system includes a locator pad and a locator plate. The locator pad is configured to be secured to a flow tube of a turbine flow meter. The locator plate is configured to be moveably affixed to the pad.

BRIEF DESCRIPTION OF THE DRAWINGS

For a detailed description of exemplary embodiments of the invention, reference will now be made to the accompanying drawings in which.

NOTATION AND NOMENCLATURE

Throughout the following description and claims, certain terms are used to refer to particular system components. As one skilled in the art will appreciate, companies may refer to the same component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Turbine flow meters include electromagnetic sensors (pickups) that detect the proximity of turbine blades or other detectable rotating features as the fluid motion causes the turbine to rotate. Turbine flow meters relying on close tolerance machining operations, and precision assembly to accurately locate the pickups relative to other meter components are subject to error. An error in pickup positioning can result in improper operation and rejection of the meter.

Embodiments of the present disclosure include adjustable pickup positioning. The position of an electromagnetic pickup may be varied in one or more directions during meter assembly/calibration to allow proper positioning of the pickup relative to other meter components. Thus, embodiments disclosed herein are intended to provide accurate positioning of the pickup with relaxed machine tolerances, resulting in reducing waste, rework, and associated expense.

Figure 1:
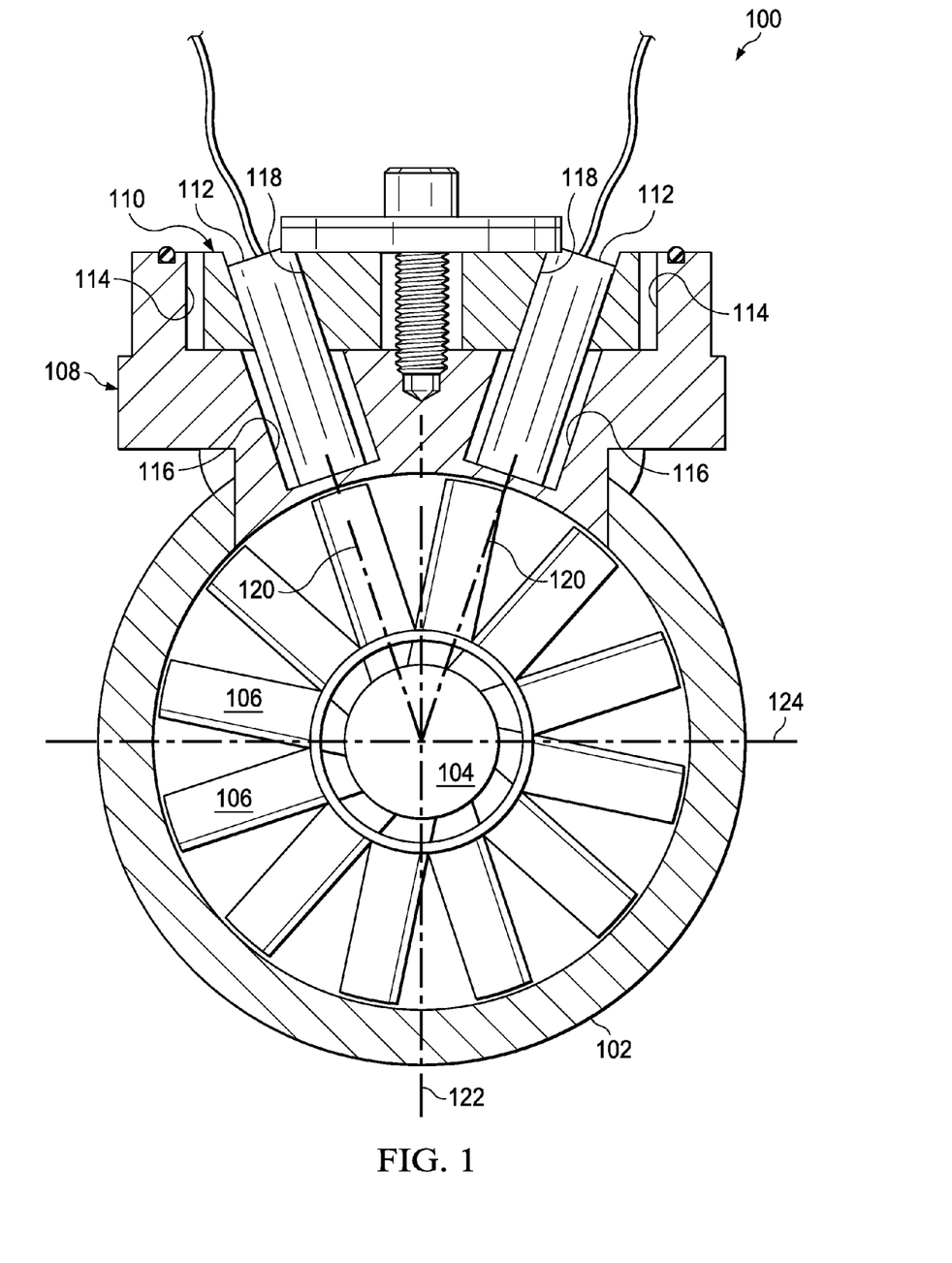
FIG. 1 shows a cross section view of a turbine flow meter including electromagnetic pickup position adjustment in accordance with various embodiments.

FIG. 1 shows a cross section view of a turbine flow meter 100 including pickup position adjustment in accordance with various embodiments. The turbine flow meter 100 includes a flow tube 102, a rotor assembly 104, a locator pad 108, a locator plate 110, and two or more electromagnetic pickups 112. The rotor assembly 104 includes a plurality of blades 106 and is disposed within the flow tube 102. In the embodiment of the flow meter 100 shown in FIG. 1, the rotor assembly 104 is disposed to rotate about a point substantially centered in the flow tube 102.

The locator pad 108 is attached (e.g., welded, molded, etc.) to the flow tube 102. The locator pad 108 includes recesses 114 and 116. The recess 114 is contoured to retain the locator plate 110 and allows for horizontally (i.e., in a plane substantially perpendicular to the centerline 122) varying the position of the locator plate 110 in the locator pad 108 within a predetermined range (e.g., ⅛" of position variation). The recesses 116 are configured to retain the pickups 112 and allow for varying the horizontal positions of the pickups 112 in correspondence with the position of the locator plate 110. In the embodiment of FIG. 1, the recesses 116 in the locator pad 108 are generally cylindrical with an oblong cross section. In other embodiments, the recesses 116 may have a circular, elliptical, or other shaped cross section. The locator pad 108 may be formed of stainless steel or another substantially non-magnetic material.

The locator plate 110 includes channels 118 configured to pass the pickups 112 into the locator pad 108. The channels 118 may be sized to allow longitudinal movement of the pickups 112 while restraining the pickups 112 laterally at a predetermined angle. For example, the channels 118 of the locator plate 110 are configured to position the pickups 112 such that the centerlines 120 of the pickups 112 intersect at the horizontal centerline 124 of the flow tube 102 (i.e., the axis of the rotor assembly 104). The locator plate 110 may be formed of stainless steel or another substantially non-magnetic material.

The locator plate 110 is dimensioned to fit within the recess 114 of the locator pad 108, and to be moveably positioned within the recess 110. For example, it is desirable to position the locator plate 110 such that the centerlines 120 of the electromagnetic pickups 112 intersect at the centerline 122 of the flow tube 102. Thus, the locator plate 110 can be moved laterally with respect to the flow tube 102 (i.e., in the direction of the center line 124), to adjust the point of intersection of the centerlines 120 of the pickups 112 to be on the centerline 122 of the flow tube 102.

In some embodiments of the turbine flow meter 100, an optimal position for pickups 112 is a position wherein the signals produced by the two pickups 112 are approximately 90° (e.g., 90°±45°) out of phase. The phase difference between the signals produced by the two pickups 112 is used to validate proper operation of the flow meter 100. The difference between the two signals is a product of various factors, including the lateral position of the pickups 112 relative to the flow tube 102. Turbine flow meters lacking adjustment for mispositioned pickups may not provide signals having a phase difference indicative of proper meter operation, and may therefore require costly rework.

Figure 2:
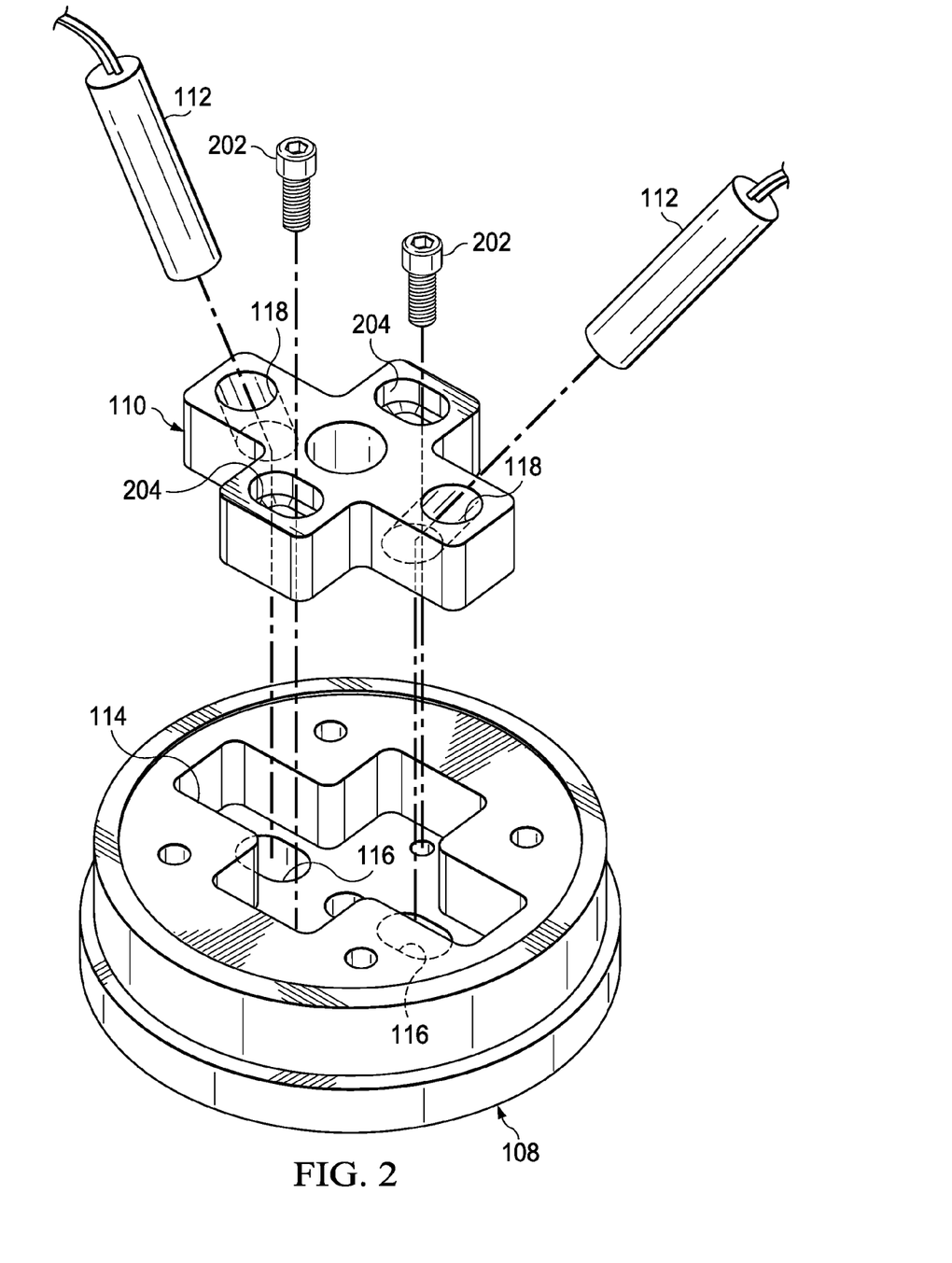
FIG. 2 shows a perspective view of a locator pad and a locator plate for adjusting the position of electromagnetic pickups in a turbine flow meter in accordance with various embodiments.

FIG. 2 shows a perspective view of a locator pad 108 and a locator plate 110 for adjusting the position of electromagnetic pickups 112 in a turbine flow meter 102 in accordance with various embodiments. The locator plate 110 is dimensioned to fit within the recess 114 of the pad 108. The pickups 112 are positioned in the recesses 116 of the pad 108 via the channels 118 of the locator plate 110. The locator plate 110 includes channels 204 through which fasteners (e.g., the bolts 202) secure the locator plate 110 to the pad 108 when the locator plate 110 has been properly positioned. The channels 204 are dimensioned to allow the locator plate 110 to be repositioned in the recess 114 of the locator pad 108. In various embodiments of the locator plate 110, the channels 204 are dimensioned to allow for adjustment of the position of the locator plate 110 along one or more axes (e.g., laterally or longitudinally relative to the flow tube 102).

Figure 3:
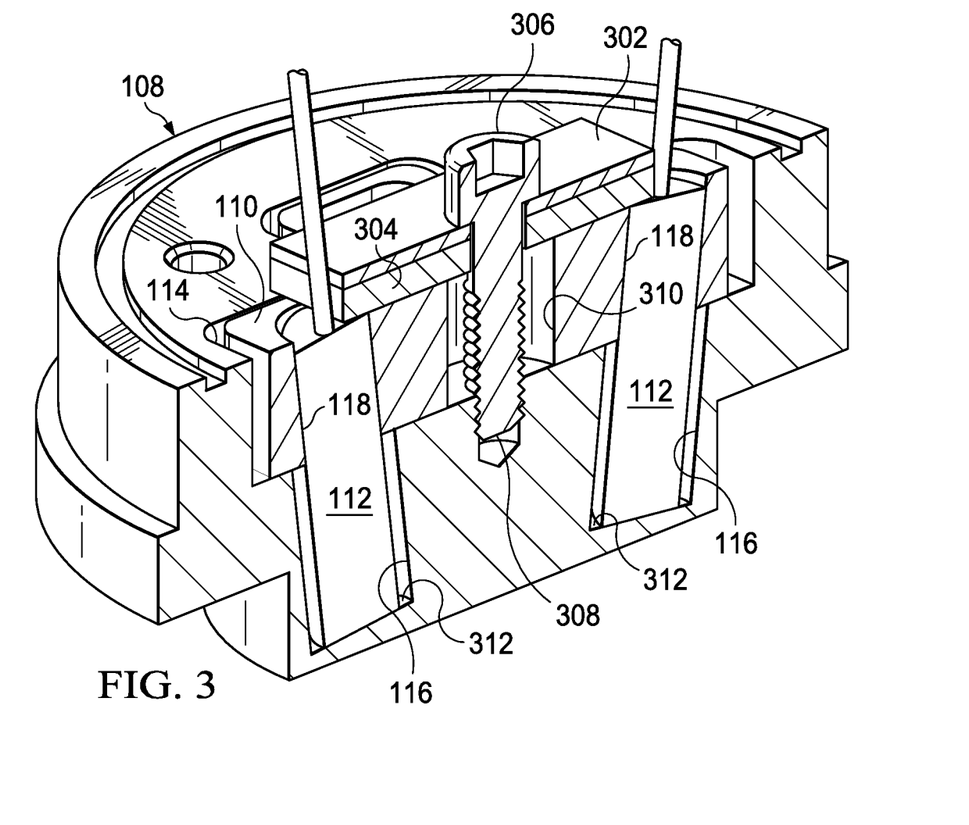
FIG. 3 shows a perspective cross section view of the locator pad and the locator plate shown in FIG. 2.

FIG. 3 shows a perspective cross section view of a locator pad 108 and a locator plate 110 for adjusting the position of electromagnetic pickups 112 in a turbine flow meter 102 in accordance with various embodiments. The locator plate 110 is disposed in the recess 114 of the pad 108. The pickups 112 are disposed in the recesses 116 of the pad 108 via the channels 118 of the locator plate 110. The pickups 112 are vertically secured by pressure from a retainer 302. The retainer 302 may include an elastic component (e.g., a spring or a layer of elastomeric material 304, such as neoprene. The retainer 302 is fastened to the locater plate 110 and the locator pad 108 by a bolt 306 inserted in a threaded channel 308 of the locator pad 108 through a channel 310 in the locator plate 110. The channel 310 is dimensioned to allow a predetermined range of locator plate 110 adjustment for aligning the pickups 112 as described above. In other embodiments, the retainer 304 is fastened to the locator pad 108 and/or the locator plate 110 by another fastening mechanism known in the art.

In the embodiment of FIG. 3, the surfaces 312 of the recesses 116 determine the axial positions of the pickups 112. The pickups 112 are positioned in the recesses 116 such that the distal end of each pickup 112 is against a surface 312 and the proximal end of each pickup 112 is against the retainer 302. In other embodiments, the distal end of the pickup 112 may not make contact with the surface 312 and/or the axial position of the pickup 112 may be adjustable. In such embodiments, the surface 312 need not be precisely located and the axial position of a pickup 112 can be fixed by operation of a set screw associated with the locator plate 110, by engaging threads of the pickup 112 with a threaded channel 118 of the locator plate 110, or by another means known in the art.

Figure 4A:
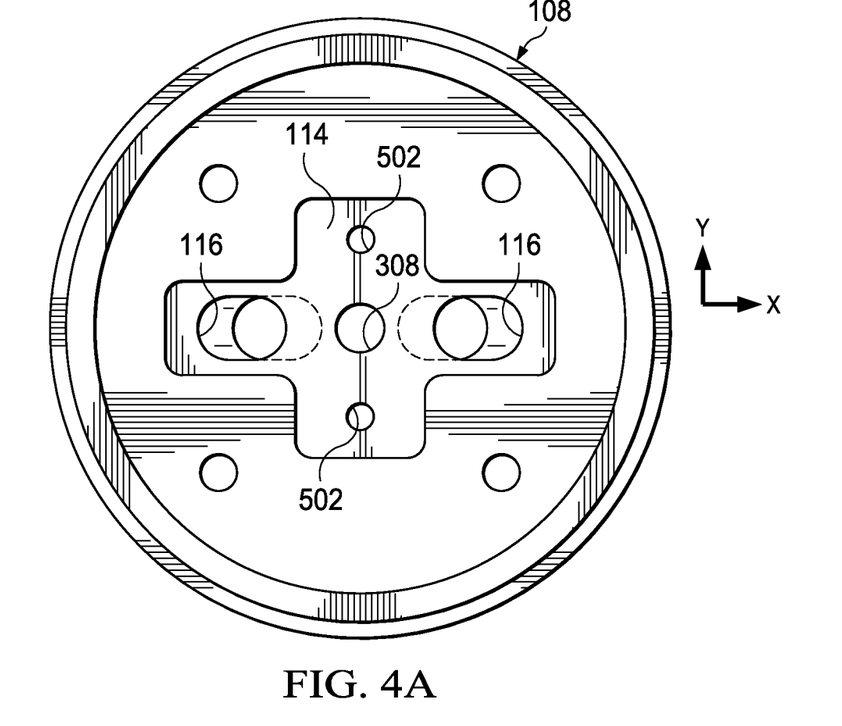
FIG. 4 shows a top view of the locator pad and the locator plate shown in FIGS. 2 and 3.
Figure 4B:
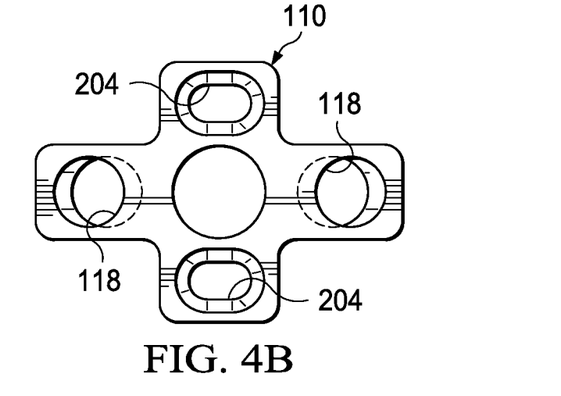

FIG. 4 shows a top view of a locator pad 108 and a locator plate 110 for adjusting the position of electromagnetic pickups 112 in a turbine flow meter 102 in accordance with various embodiments. As shown, the locator pad 108 includes oblong recesses 116 that allow for lateral repositioning of the locator plate 110 and the electromagnetic pickups 112. In some embodiments of the locator pad 108, the recesses 116 are shaped to provide for longitudinal or longitudinal and lateral repositioning (e.g., lateral is along the X axis and longitudinal is along the Y axis) of the locator plate 110 and the electromagnetic pickups 112. The locator pad 108 also includes threaded holes 502 that accept bolts 202 for securing the locator plate 110 to the locator pad 108.

Figure 5:
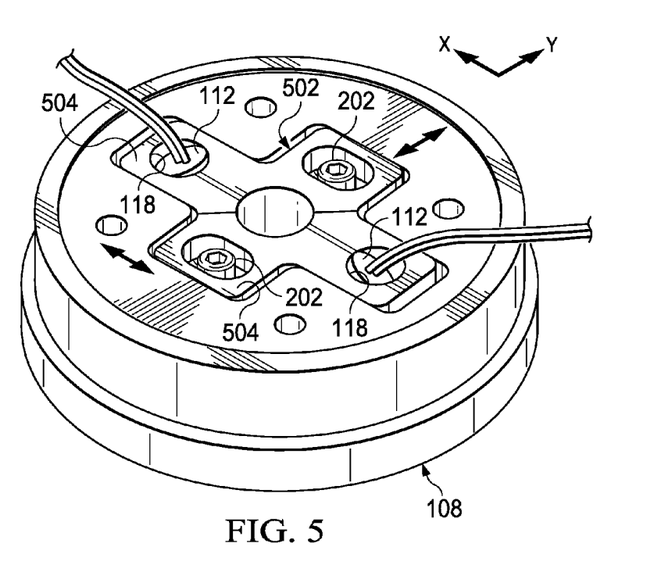
FIG. 5 shows a locator pad and a locator plate for adjusting the position of electromagnetic pickups in a turbine flow meter along multiple axes in accordance with various embodiments.

FIG. 5 shows a locator pad 108 and a bifurcated locator plate 502 for adjusting the position of the electromagnetic pickups 112 in a turbine flow meter 102 along multiple axes in accordance with various embodiments. The bifurcated locater plate 502 includes two locator sections 504, each comprising a pickup channel 118. Each locator section 502 may be laterally and/or longitudinally (with respect to the flow tube 102 of FIG. 1, where lateral is along the X axis and longitudinal is along the Y axis) positioned independently of the other locator section 502, thereby allowing independent positioning of each electromagnetic pickup 112.

Figure 6:
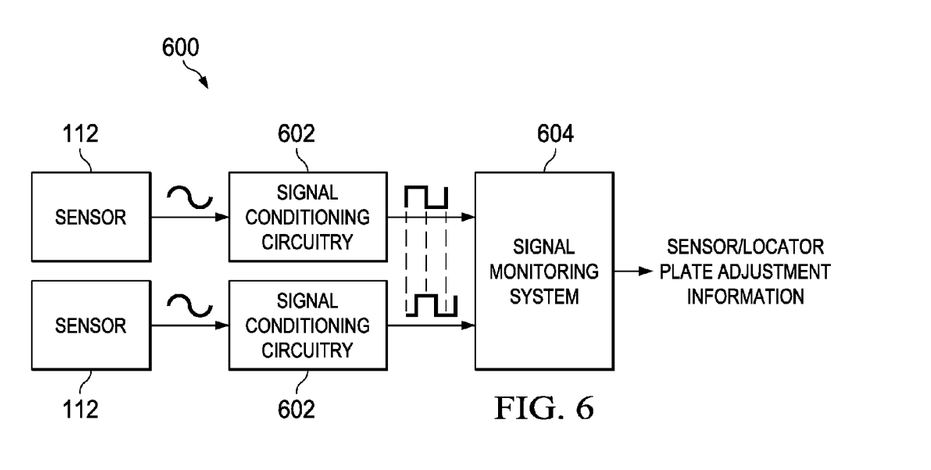
FIG. 6 shows a block diagram of a system for calibrating a turbine flow meter by adjusting the position of electromagnetic pickups in accordance with various embodiments.

FIG. 6 shows a block diagram of a system for calibrating a turbine flow meter 100 by adjusting the position of electromagnetic pickups 112 in accordance with various embodiments. The electromagnetic pickups 112 of the flow meter 100 are coupled to signal conditioning circuitry 602. The signal conditioning circuitry 602 may be internal or external to the flow meter 100. The signal conditioning circuitry 602 may include an amplifier and/or a comparator configured to convert the analog signals generated by the electromagnetic pickups 112 to square wave signals.

A signal monitoring system 604 is coupled to the signal conditioning circuitry 602. The signal monitoring system 604 may include an oscilloscope, or a computer, or another device configured to measure and/or display the time difference between the edges or other timing indications of the signals provided by the signal conditioning circuitry 602. The signal monitoring system 604 provides information (e.g., signal phase difference information, signal timing difference information, etc.) that can be used to adjust the position of the locator plate 110 and the electromagnetic sensors 112 secured thereto.

Figure 7:
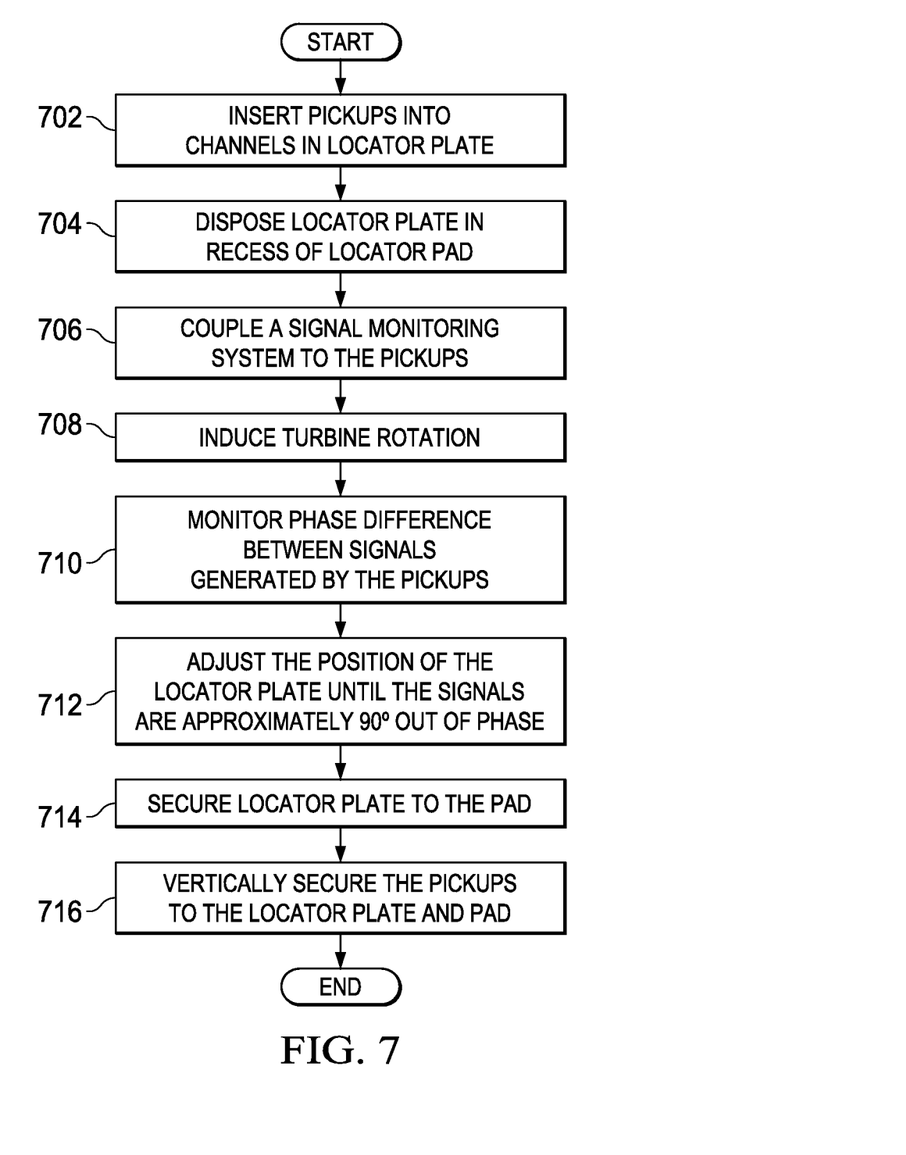
FIG. 7 shows a flow diagram for a method for calibrating a turbine flow meter by adjusting the position of electromagnetic pickups in accordance with various embodiments.

FIG. 7 shows a flow diagram for a method of adjusting the position of the electromagnetic pickups 112 in a turbine flow meter 102 in accordance with various embodiments. Though depicted sequentially as a matter of convenience, at least some of the actions shown can be performed in a different order and/or performed in parallel. Additionally, some embodiments may perform only some of the actions shown.

In block 702, the electromagnetic pickups 112 are inserted into the channels 118 of the locator plate 110. The channels 118 allow longitudinal movement of the pickups 112 but inhibit lateral movement of the pickups 112 independent of the locator plate 110.

In block 704, the locator plate 110 is disposed in the recess 114 of the locator pad 108. The recess 114 is dimensioned to allow a predetermined range of locator plate horizontal movement (e.g., lateral and/or longitudinal with respect to the flow tube 102, where lateral is in the direction of the center line 124 and longitudinal is in the direction of flow).

In block 706, a signal monitoring system 604 is coupled to the electromagnetic pickups 112. In one embodiment, the signal monitoring system may be an oscilloscope. In another embodiment, the signal monitoring system may be a processing system (e.g., a digital computer) configured to analyze parameters (e.g., frequency, phase, etc.) of the signals produced by the pickups 112.

In block 708, rotation is induced in the turbine assembly 104. In some embodiments, a fluid stream flowing at a known rate causes the turbine assembly 104 to rotate.

In block 710, the phase difference between the signals generated by the electromagnetic pickups 112 is monitored. The position of at least a portion of the locator plate 110 is adjusted, in block 712, until the signals generated by the electromagnetic pickups 112 exhibit a predetermined amount of phase difference. For example, in some embodiments, the predetermined amount of phase difference may be approximately 90° (e.g., 90°±45°). The locator plate 110, or a portion thereof, may be adjusted laterally and/or longitudinally (with respect to the flow tube 102) to achieve the predetermined amount of phase difference between the signals.

In block 714, the locator plate 110 is secured to the locator pad 108 by the bolts 202. The pickups 112 are vertically secured to the locator plate 110 and the locator pad 108 by the retainer 302 and bolt 306 in block 716.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A turbine flow meter, comprising:
a flow tube;
a plurality of electromagnetic pickups configured to detect rotation of a flow indicator in the flow tube;
a locator plate to which the pickups are secured;
wherein the locator plate is configured to provide adjustment of a lateral position of the pickups relative to the flow tube.

2. The turbine flow meter of claim 1, further comprising a locator pad configured to be affixed to the flow tube, and to retain the locator plate over a range of locator plate positions.

3. The turbine flow meter of claim 2, wherein the locator pad includes a plurality of recesses, each recess corresponding to one of the pickups and configured to accommodate a predetermined range of adjustment of the position of the pickup.

4. The turbine flow meter of claim 3, wherein each recess includes a surface that determines an axial position of the pickup within the recess.

5. The turbine flow meter of claim 3 wherein the locator plate is configured to adjustably retain each of the pickups within the corresponding recess of the locator pad at any of a plurality of axial positions.

6. The turbine flow meter of claim 1, wherein the locator plate is configured to provide adjustment of a longitudinal position of the pickups relative to the flow tube.

7. The turbine flow meter of claim 1, wherein the locator plate is configured to provide adjustment of at least one of a lateral and a longitudinal position of a first of the pickups independent of a position of a second of the pickups.

8. The turbine flow meter of claim 1, wherein the locator plate is adjustable in response to pickup positioning errors causing other than a predetermined amount of phase difference between detection signals produced by two of the pickups.

9. A method for calibrating a turbine flow meter, comprising:
securing a plurality of electromagnetic pickups to a locator plate;
adjusting a position of the locator plate relative to a flow tube of a turbine flow meter until detection signals generated by two of the pickups exhibit a predetermined amount of phase difference; wherein the locator plate is configured to provide adjustment of a lateral position of the pickups relative to the flow tube.

10. The method of claim 9, further comprising affixing the locator plate to a locator pad attached to the flow tube; wherein affixing the locator plate to the pad comprises positioning the locator plate in a recess of the locator pad.

11. The method of claim 9, wherein the predetermined amount of phase difference is approximately 90 degrees.

12. The method of claim 9, further comprising:
coupling a signal monitoring system to the electromagnetic pickups; and
monitoring a phase difference between flow detection signals generated by two of the electromagnetic pickups.

13. The method of claim 12, wherein the adjusting is based on the monitoring.

14. The method of claim 9, further comprising adjusting a longitudinal position of the locator plate relative to the flow tube.

15. The method of claim 9, wherein the adjusting comprises positioning a first of the electromagnetic pickups independently of a second of the electromagnetic pickups by repositioning a portion of the locator plate while a different portion of the locator plate is stationary.

16. A flow meter pickup mounting system, comprising:
a locator pad configured to be secured to a flow tube of a turbine flow meter; and
a locator plate configured to be moveably affixed to the locator pad and to provide adjustment of a lateral position of electromagnetic sensors relative to the flow tube.

17. The mounting system of claim 16, wherein the locator plate is configured to retain a plurality of electromagnetic sensors.

18. The mounting system of claim 16, wherein the locator pad includes a recess configured to hold the locator plate therein, and to allow the locator plate to be repositioned within the recess.

19. The mounting system of claim 16, wherein the locator plate and the locator pad are configured to allow longitudinal adjustment of a position of the locator plate relative to the flow tube.

20. The mounting system of claim 16, wherein the locator plate is configured to allow an electromagnetic sensor to protrude into a recess of the locator pad.

21. The mounting system of claim 20 wherein a surface of the recess determines an axial position of the electromagnetic sensor.

22. The mounting system of claim 20 wherein the locator plate is configured to adjustably retain the electromagnetic sensor within the recess of the locator pad at any of a plurality of axial positions.

23. The mounting system of claim 14, further comprising a retainer secured to the locator plate, the retainer configured to fasten an electromagnetic sensor to the locator plate.

* * * * *